Jan. 2, 1968  J. L. DEXTER  3,361,192
TEMPERATURE CHAMBER
Filed Feb. 7, 1966
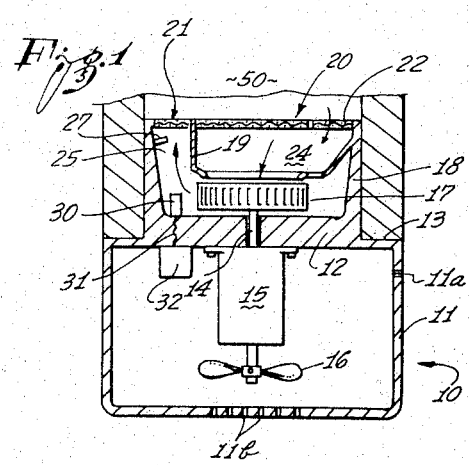
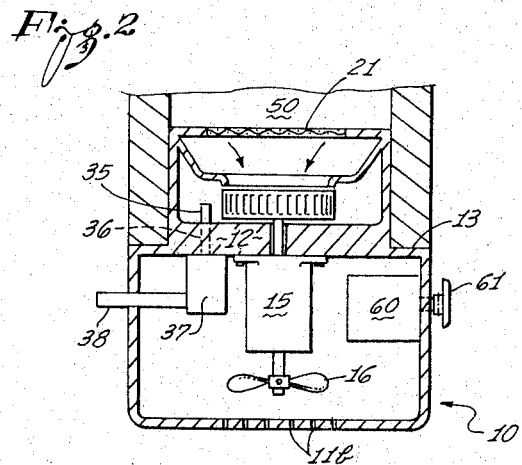
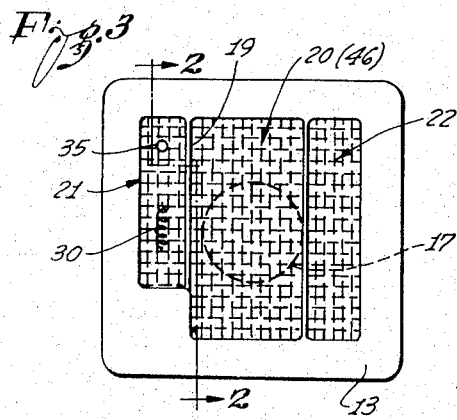
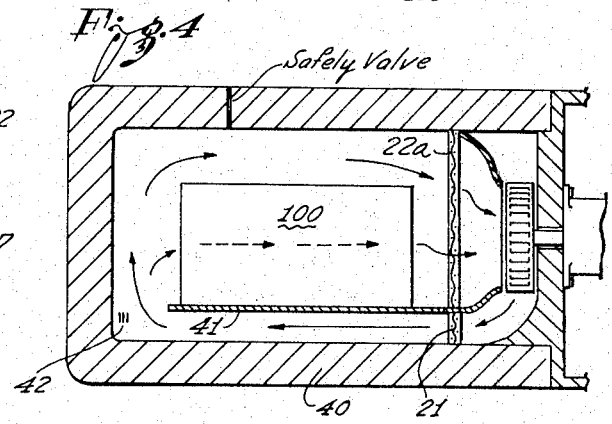
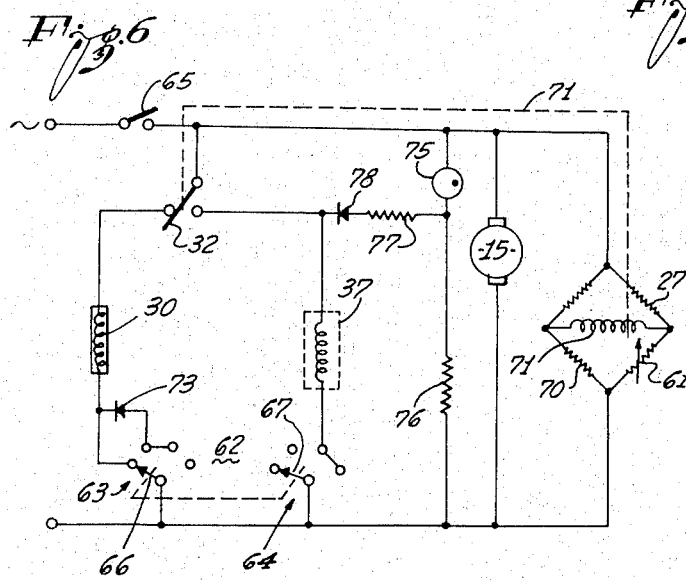
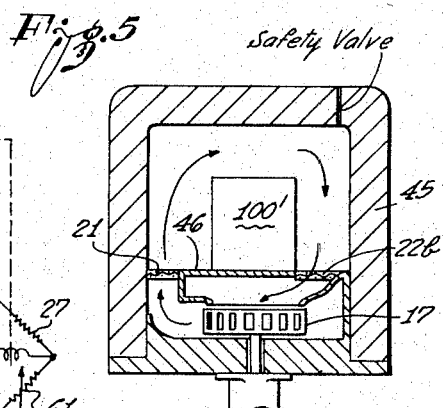
INVENTOR:
JOHN L. DEXTER
ATTORNEYS

United States Patent Office
3,361,192
Patented Jan. 2, 1968

3,361,192
TEMPERATURE CHAMBER
John L. Dexter, Culver City, Calif., assignor, by mesne assignments, to Varo Inc. Electrokinetics Div., Santa Barbara, Calif., a corporation of California
Filed Feb. 7, 1966, Ser. No. 525,432
5 Claims. (Cl. 165—26)

ABSTRACT OF THE DISCLOSURE

A temperature chamber with heat and coolant injection and constructed to provide flow enveloping a stored object on all sides.

---

The present invention relates to temperature chambers of the type used for testing the behavior of objects under specified temperature conditions, or for purposes of storing objects which require particular temperatures to prevent them from deterioration.

The temperature chamber which is the object of the present invention is primarily comprised of two units. One of the units, to be denoted controls unit, includes all the elements necessary to establish within a confined area thermal conditions of a predeterminal nature. The other part defines this confined space in form of the temperature chamber proper. The second portion basically can be exchangeable, in that different types of enclosures are being used for defining different volumes for the chamber. The two portions together are interconnected to form a common enclosure which is thermally insulated against the exterior space.

The controls unit has two windows with which the controls unit communicates with the temperature chamber proper. This communication is a twofold one, and by way of two airflow paths. The controls unit includes a blower which sucks air from the temperature chamber through one window into the controls unit, passes such air through a temperature modifying device and discharges this air through the second window back into the temperature chamber proper.

The objects to be maintained at a particular temperature are supported in the temperature chamber proper and on a tray therein which tray in addition has an airflow dividing function. Within the controls unit there is a partitioning which separates the airflow path therein in order to ensure proper circulation. One airflow path leads from the first mentioned window into the blower and the other airflow path leads from the blower past the temperature modifying elements to the second window, and these two airflow paths should not mix inside of the controls unit; the partitioning prevents this mixing. The tray which offers a supporting surface to the temperature chamber proper serves as an extension of this partitioning and ensures that air circulation in the temperature chamber proper is of such nature that the air entering the temperature chamber proper from one of the windows envelopes the object on the tray and is returned only after proper circulation around the objects to be thermally treated, back to the window through which the blower sucks such air into the controls unit.

Basically as temperature modifier it is suggested to use two types of elements. First there is a heater which selectively can be turned on and off in case the temperature in the temperaturre chamber proper is of an elevated value. A control is established by balancing the heat outflow (loss) through the walls of the temperature chamber proper and the heat inflow as resulting from the temporary turning on of this heat source. It will be developed more fully below, that this range can be bi-parted whereby the heater operates at different capacity.

Should the temperature to be maintained in the temperature chamber be rather low, i.e. below the usual environmental temperatures conditions, then a liquid coolant is injected into the air flow as it leaves the blower. This coolant injection serves as a heat sink, and it is also being turned on and off, so that again for low temperatures a balance at the desired temperature is established, between the heat inflow into the temperature chamber proper and the heat sink as provided by the injection of a very cold medium as coolant.

In a third range which usually includes the environmental temperatures to be expected, the temperature control results from alternation between the turning on of the heater and the turning on of the coolant injection, whereby, of course, the two elements will never be turned on simultaneously but alternatingly only.

Switching means are provided to change from one of the control ranges to another one as the case requires. Preferably in the area between the temperature modifying elements and the outflow window there is provided a temperature sensitive element which serves as an electrical input element for feed-back type temperature control. It can thus be seen that the elements necessary to establish a controlled temperature at vigorous air circulation are all housed in the controls unit, and by selecting a suitable cover above the two windows of the controls unit, one thereby defines the volume necessary to accommodate a particular number or a particular size of objects to be maintained at a particular temperature.

While the specification concludes with claims particularly pointing out and distinctly claiming the subject matter which is regarded as the invention, it is believed that the invention, the objects and features of the invention, and further objects, features and advantages thereof will be better understood from the following description taken in connection with the accompanying drawing, in which:

FIGURE 1 illustrates a cross-sectional view through the controls unit in accordance with the invention;

FIGURE 2 illustrates a cross-sectional view through the same chamber taken along section lines 2—2 in FIGURE 1;

FIGURE 3 illustrates a top view of the controls unit with a cover for the temperature chamber proper removed;

FIGURE 4 illustrates a first enclosure for a temperature chamber having a relatively large volume;

FIGURE 5 illustrates a second temperature chamber defining enclosure of relatively small volume; and FIGURE 6 illustrates schematically a circuit diagram for the control elements which establish the desired thermal conditions in the temperature chamber of the present invention.

Proceeding now to the detailed description of the drawings, in FIGURES 1 and 2 thereof there is shown in cross-sectional view the controls unit 10 for the inventive temperature chamber. The controls unit 10 comprises a housing or casing 11 which includes all of the control elements necessary to perform the desired temperature regulation. The housing 11 is closed by means of a divider or partitioning wall 12 which is rather thick in order to provide for temperature insulation between the interior of housing 11 and the space above the wall 12.

Four side walls 18 extend from divider wall 12 in upward direction but somewhat recessed from the side walls of casing 11 to thereby define a shoulder 13, which will engage the top rim of the housing which encloses the temperature chamber 50. The variety in the configuration of the housing will be explained more fully with reference to FIGURES 4 and 5. The divider wall 12, in addition, has a somewhat centrally located aperture 14, which is traversed in a sealed manner by a shaft which is the driving shaft of a motor 15. The motor is mounted on the lower surface of wall 12 to extend into the interior of the housing 11. The shaft projects also below the lower side of the motor 15 and carries a cooling fan 16 which serves to cool the motor 15. Housing 11 has at least one inlet vent 11a through which air can be sucked by the fan into the interior of the housing 11, and the heated air is discharged through a centrally located exhaust aperture 11b which, as is schematically indicated, may be covered by a screen.

The top part of the shaft of the motor 15 projects through the aperture 14 in wall 12, as stated, and carries an impeller wheel 17. The impeller wheel 17 rotates in the chamber defined by the upwardly extending wall 18. This chamber is an airflow chamber which, however, is partitioned in a manner to be described in the following.

First of all, there is a divider wall 19 extending as can be seen best from FIGURE 3, from one of the walls 18 to the opposite one and in parallel to the two adjoining ones. Wall 19 thus divides this airflow chamber into a suction chamber 24 and a pressure chamber 25, both these chambers adjoining the impeller wheel 17. The airflow chamber has an upper window structure 20 which extends across the top of walls 18.

The pressure chamber 25 is positioned in relation to the impeller wheel 17, so that air discharged radially from the wheel 17 flows into the pressure chamber. The top window 20 has a first window 21 extending over the pressure chamber 25 so that the air discharges from the pressure chamber 25 through the window 21 and into temperature chamber 50. There may or may not be a screen across window 21. The suction chamber 24 communicates with the temperature chamber 50, also through the window structure 20. A portion of this upper opening of chamber 24 may be covered by a tray, but at least a portion of the suction chamber 24 is merely covered by a screen 22, defining a second window.

Whether the entire area of the top chamber 24 is covered by a screen or whether only a portion thereof is covered by a screen and the rest by a tray, will depend on the size of the temperature chamber 50. In any event, air may enter through the screened portion 22 of the window structure above chamber 24, and this air is sucked in axially by the impeller wheel 17, to be discharged for circulation into pressure chamber 25.

In the flow path of air as it passes through the pressure chamber 25 there is provided a temperature sensing element 27 which extends directly into the flow path and has electrical connections (not illustrated) leading into the interior space of casing 11 for purposes of performing control functions therein. The control elements themselves are not illustrated in detail in the casing as their placement therein is merely a matter of convenience. The circuit elements are described in general by the number 60. These circuit elements will be described below with reference to FIGURE 6 and they are capable of suitably processing temperature indicating electrical signals derivable from sensing element 27.

In order to confine the suction chamber 24 to an axial intake a guide wall 23 extends around the impeller wheel 17 merging into side walls 18 as well as into partition 19, and thus guiding the air in axial direction into the impeller wheel 17. In the flow path of the air in the pressure chamber 25 there is positioned a heating element 30, which may be an electrical heating resistor and which is mounted on the top portion of the divider wall 12. Wires 31 pass through the divider wall 12, and there is provided an electrical switch such as 32 in the interior space of housing 11. This switch 32 is controlled by the temperature sensitive element 27 in a manner explained below.

In chamber 25 and next to the heating element 30 there is provided a discharge nozzle 35 positioned to inject a cooling medium such as $CO_2$ into the airflow path in pressure chamber 25. The nozzle 35 communicates with a duct 36 which traverses the divider wall 12. Duct 36 is the outlet of a valve 37 which is also controlled by the temperature sensitive element 27. A cover such as 40 or 45 above the window area 20 defines the temperature chamber 50; air is blown into this chamber through window 21, and after circulation in the chamber 50 and around the object to be maintained at a particular temperature, the air is sucked into window 22. If heating is required, heater 30 is turned on; if cooling is required, valve 37 is opened for the injection of the coolant. The effect of heating and/or cooling together with the influence of the environment, is detected by the temperature sensitive element 27 which is positioned in the exit path of the air's circulation.

It will, of course, be understood that in addition there is provided a manually accessible temperature adjusting knob 61 which permits selection of the desired temperature value to be kept constant. The control range basically can be divided into three range portions. There is a first range which definitely and under all circumstances will require exclusively the operation of the heating device to maintain the temperature in the temperature chamber at the desired, elevated level. Thus, the heating device will be operated to compensate for the heat loss resulting from heat transfer into the cooler environment. By way of error signal type feedback control, control network 60 will operate switch 32 to turn the heating element 30 on and off. Of course, the frequency of the turning on and off cycles determines the average heat provided by the heating element 30, to thereby determine the actual temperature as it exists in the temperature chamber. Using the temperature sensitive device 27 stable conditions can be maintained if at the particular temperature of the chamber 50 the heat loss to the environment equals the heat gain from the heater.

The second temperature range of interest is that which definitely requires at all times a cooling. Here then, the temperature in chamber 50 is to be maintained below the temperature of the environment and the continuous influx of heat into the chamber 50 must be compensated by cooling. For this case there will be operated the valve 37 to discharge more or less frequently $CO_2$ liquid into the pressure chamber 25 for passage into the temperature chamber 50 to maintain therein the desired low temperature. Again the temperature sensitive element 27 will determine the frequency of the turning on and off of the valve 37.

The third range is about equal to or somewhat larger than temperature of the usual or expected environment. Depending on the momentary environmental temperature it may be necessary to at times cause the discharge of cooling $CO_2$ or to heat the airflow as it passes through the chamber 25. The temperature can be maintained constant very accurately with the employment of both the heating device and of cooling device. Of course, the circuit must be selective in such a manner that not both elements are being turned on at the same time, but are operated in a mutually exclusive mode permitting alternating operations in order to maintain the desired temperature within tight limits.

It should be mentioned that basically one could provide for alternating operation of coolant injector 35 and of heater 30 over the entire range, but the tri-parting of the range is, first of all, more economical, and secondly, in the higher temperature the outflow of heat is so fast that when the heater is off, so that a simple turning on and off of the heater is preferred. At very low temperatures the situation is similar due to fast environmental heating when the valve 37 is turned off.

It can thus be seen that controls unit 10 contains all the necessary operating elements to maintain the temperature in chamber 50 within limits which are determined solely by the capacity of the unit. The window structure 20 of the controls unit 10 as it communicates with temperature chamber 50 provides controlled, uniform air circulation through both the temperature chamber and the airflow chamber. The impeller 17 in the airflow chamber sucks air from the temperature chamber through the screen 22 in the interface with the temperature chamber, and the temperature of the air is measured in the pressure chamber 25.

The air is discharged radially by the impeller 17 into the pressure chamber 25 whereby the discharged air must pass both the nozzle outlet 35 and the heating element 30. Depending upon the requirements, either heat or a coolant is injected into the airflow whereby the blower ensures instant mixing of the air as it blows from the blower with the air in the immediate environment of heater and nozzle in the pressure chamber 25. From there the air is discharged through the screen 21. The unit thus is capable of maintaining a vigorous circulation of air in chamber 50 at a very accurately controlled temperature.

We proceed now to the description of FIGURES 4 and 5. In FIGURE 4 there is shown that the temperature chamber 50 is defined by a rather long housing 40. This housing 40 is comprised of rather thick side walls and an end wall. The other end of this housing is open having a rim which rests and can be attached to the shoulder 13 of controls unit 10. The object, sometimes called a thermo package, is positioned centrally in chamber 50. For this purpose there is provided a long table or tray 41 attached to window structure 20 in a manner to form an extension of the dividing wall 19, i.e., perpendicularly to the plane of window area. This means that the air that discharges from the pressure chamber 25 through window 21 first passes underneath the table 41 maintaining the table or tray itself at the desired temperature. As the table or tray 41 is subjected to the temperature controlled airflow, the bottom of the thermo package will be cooled or heated through the table 41, so that in effect the table 41 can be considered as being a portion of the thermo package. It is possible or may be convenient to eliminate the screen across window 21 and to transfer its location to opening 42 as defined between the end of tray 41 and the rear wall of housing 40; this is optional and not of principal importance.

The air after having passed underneath the table 41 is deflected by the bottom wall of housing 40. The air will then pass in upward direction and fan around the thermo package 100. In FIGURE 4 the entire window structure above the suction chamber 24 is a screen 22a to permit the air to flow along the entire side of the thermo package 100 which directly faces the window 20. It can thus be seen that a continuous circulation of air is maintained to envelop the thermal package 100.

FIGURE 5 illustrates substantially the same controls unit 10 which can be used in cooperation with a smaller housing 45. It will be understood that, of course, the temperature chamber 50 is to be made only as large as necessary to accommodate the particular thermo package, and temperature conditions can be maintained constant more satisfactorily the smaller the volume of the temperature chamber to be maintained at a constant temperature. Thus, if the thermo package is a rather small one, a small housing such as 45 is preferred. In this case now a portion of the window structure 20 above the airflow chamber is a tray 46, which may be a solid or perforated sheet to serve as table for the thermo package 100'. In this case the intake window 22 area is confined to a smaller region covered by screen 22b, as is also illustrated by the dash-dot line in FIGURE 3. Of course, there is no table extending away from the screen 21, but one can see that a wall of the thermo package itself, so to speak, forms an extension of the dividing wall 19 to ensure separation of flow at windows 21 and 22b. In the embodiment of FIGURE 5 there is likewise maintained full circulation around the thermo package with temperature sensing at the air exit side of the blower and heating or cooling in the pressure chamber.

In FIGURE 6 there is illustrated a circuit diagram used for operating the controls unit 10. These elements are all housed in the interior space of casing 11. This, of course, holds true strictly only for the circuit elements other than the heater element 30 which is directly positioned in the pressure chamber 25 on the high pressure side of the impeller 17. There is provided an ordinary on-switch 65 which when closed causes electric power to be supplied to all of the elements including, of course, the motor 15, which drives its cooling fan and impeller 17. There is provided a ganged, four-position switch 62 having two switching portions 63 and 64 and ganged wiper arms 66 and 67 respectively. The central arms 66 and 67 respectively govern the connection of one terminal end of heating element or heating resistor 30 and of the solenoid for the controlled valve 37 to one of the power supply lines. The respective other electrical terminals of the two elements 30 and 37 can be connected by means of the control switch 32 to the other power input terminal, provided switch 65 is closed. The control switch 32 is operated by means of a relay 71 which is controlled by an electrical circuit network 70 which provides for the formation of an error signal. The particulars of this circuit 70 are not of immediate importance here. By way of example, this network 70 may comprise a bridge circuit having an adjustable potentiometer which is operated by knob 61 so as to adjust the desired temperature. The adjustment is balanced by the effective resistance offered by the temperature sensing element 27 which forms the second branch of the bridge circuit and is placed in the flow path of the air as it circulates in the airflow chamber 24; fixed resistors form the two other branches.

Whenever the actual temperature in the airflow chamber 24 falls below the desired level relay 71 places the switch 32 into the illustrated position; if the temperature as sensed by element 27 exceeds the preadjusted and desired value switch 32 is placed in the alternative position. Electrical control circuits of this nature are well known and do not require elaboration.

The actual control effect now produced by switch 32 depends on the position of the four-position switching device 62. It will be recalled that different ranges of temperature control were found to be desirable and basically three ranges can be established in that in one range there is on-off heating, in a second range is on-off cooling, and in a third range there is alternating heating and cooling. Switch 62 serves to establish these ranges. There are actually provided four ranges, and it can well be seen that further refinement and range extension is possible by increasing the number of ranges.

If the arms 66 and 67 of switch 62 are in the illustrated position and if the switch 32 has also the illustrated position and power is turned on, then the full power of the AC supply source is applied across the heating resistor 30, which develops its maximum heating capacity for heating the pressure chamber 25, and the blower forces the heated air through window 21, in the chamber 50. However, the full heating force of register 30 is used only in the uppermost range of high temperatures attainable and maintainable in the temperature chamber 50. It can be seen that arm 67 concurrently has a position which effectively decouples the solenoid of valve 37 from the power source, independently from the position of switch 32. Thus, depending upon the balance in the bridge 70, heating element 30 is either turned on to full power or off so that the rather steep temperature gradient as against the environment will cause rather frequent turning on of the element 30 for maintaining the desired and adjusted temperature values within close limits of possible or permissible deviation.

For a lower range of temperatures, but still above ambient temperatures there still will be provided on-off control of the heater. The range switch 62 is placed so that the arms 66 and 67 engage the second set of contacts. Again in this connection the solenoid of valve 37 is effectively disconnected from the power source and can thus not become effective. The heating element 30 is not directly connected to the one power source terminal, but the connection runs over a diode 73 which operates as a one-way rectifier. This way the energy output of heater 30 is actually cut in half per unit time because during each full wave cycle of the AC, only one-half wave is applied to the heater element 30 while the half wave of opposite polarity is suppressed.

It will be noted that for a lower temperature range the full heating capacity of heater 30 may result in frequent temporary overheating due to the time lag between heat injection and sensing. Thus for the second range again there is on-off control of the heating element alone with no cooling effect introduced unless heat is applied during each cycle.

There is a third control range to which switch 62 can be adjusted, and the contact arms 66 and 67 engage the third pair of contacts of the switch. In this circuit configuration the heater 30 is connected also to the diode 73, as the second and third contacts of the switching device portion 63 are electrically interconnected, so that a change of the contact arm 66 does not change the operation of the heater. However, in this third contact position of the range switch 62, the solenoid of valve 37 can be connected to the power source. Thus, when the control switch 32 changes its position the heater 30 is turned off and the valve 37 is opened to permit injection of liquid $CO_2$ into the air as it passes through pressure chamber 25, prior to discharge through the window 21. Thus, the temperature control alternates between cooling and heating, and this is the mode of operation in the control range which includes the normally expected ambient temperature conditions, but wherein the temperature proper for the chamber 50 may well be different from the ambient temperature.

The fourth control range it attained by placing the switch 62 so that the contact arms 66 and 67 engage the fourth pair of contacts. In this case now the heater 30 is effectively disconnected from power, but the third or fourth contacts of the switching device portion 64 are interconnected so that the temperature is regulated by turning on or off the valve 37 to either admit the coolant or to prevent its injection.

The control circuit further includes an indicating system which by using a single lamp indicates the periods of turning on or off of the heater and a complementary turning off or on of the cooling device with the understanding, of course, that this indication depends on the position of the range switch 62. The indication itself is independent of the range adjustment and has to be interpreted by concurrently reading the position of the four-position range switch 62. A glow discharge lamp 75 is connected in series with a resistor 76. Depending upon the position of the control switch 32, a resistor 77 with a diode 78 connected in series will be connected across lamp 75.

Consider first the case that the range switch 62 is in the first or in the second position (on-off heating, no cooling). In this case control switch 32 either connects the resistor 77 for half-waves of one polarity across lamp 75, or switch disconnects resistor 77 from the lamp current. In the latter case the heater is on and lamp 75 glows brightly, in the former case the heater is off and the lamp is dimmed as resistor 77 effectively delays or even prevents ignition of lamp 75 for half-waves of rectifier conduction. Lamp 75 is never turned off (for one or more full AC cycles), thus indicating proper operation of the circuit as a whole and at all times. Lamp 75 will go out only in case of an operational failure or when switch 65 is opened.

When range switch 62 is in the third or fourth position (alternating cooling), then, for the time that the valve is off, some current from the lamp will flow through the solenoid of valve 37, but this current is insufficient to operate the valve. The lamp still glows brightly. This signalling state is maintained even if the heater is not on as it is the case in the fourth range. Lamp 75 will glow dimly when valve 37 is energized, as the effectiveness of the shunt path (resistor 77) for the lamp 75 is not modified by the state of energization of valve 37.

What is claimed is:

1. A temperature chamber, comprising:
   means defining a first chamber;
   means defining a second chamber positionable in relation to said first chamber;
   window defining means having first and second windows separating said first and second chamber, and permitting air communication through said first and second windows;
   a blower in said first chamber positioned to suck air from said second chamber through said first window and recirculating said air by discharging the air from the first chamber through the second window into said second chamber, there being a circulating flow established by said blower and said first and second chambers and passing through said first and second windows;
   partitioning means in said first chamber positioned in relation to said first and second windows to separate the flow of air in said first chamber as it enters the first chamber through the first window from the flow as it leaves the first chamber through the second window;
   a tray attached to said partitioning means to form a continuation thereof and being positioned to have a supporting surface facing said second chamber, further positioned in relation to said window defining means so that the circulating flow envelops the entire tray, including said supporting surface and the surface opposite thereto; and
   a heater in one of said chambers;
   means for injecting a coolant into one of said chambers; and means for selectively operating said heater and said coolant injecting means independently and alternatingly in different ranges of temperatures to be maintained in said second chamber.

2. A temperature chamber as set forth in claim 1, said tray extending perpendicularly to said window defining means and co-linear with said partitioning means.

3. A temperature chamber as set forth in claim 1, said tray extending in said window perpendicularly to said partitioning means.

4. A temperature chamber comprising:
   means defining an enclosure having a partition to define a temperature chamber proper and a second chamber, said partition having first and second windows;
   a blower in said second chamber to suck air from the temperature chamber proper through the first window into the second chamber and recirculating the air back into the temperature chamber proper through said second window;
   a heat source in said second chamber;
   a coolant injecting means in said second chamber;
   temperature sensing means positioned to monitor the temperature of air as it is circulated by said blower; and
   range adjusting means to selectively permit in a first range operation of said heat source to the exclusion of said coolant injecting means, in a second range operation of said coolant injecting means to the exclusion of said heat source, and in a third range temperature dependently alternating operation of the heat source and of the coolant injecting means.

5. In combination for use in a temperature chamber a controls unit comprising:
   means defining a chamber having first and second windows;
   a blower in said chamber;
   partitioning means in said chamber positioned in relation to said blower and said windows so that said blower sucks air through said first window into said first chamber and discharges air from said first chamber through said second window;

means for driving said blower;

a heating element positioned in said chamber and in the path of airflow through said chamber as introduced by said blower;

means defining an outlet for a coolant in said chamber positioned to inject a coolant into said path of air flow;

a temperature sensitive element in said chamber to monitor the temperature of the air in said path of air flows;

control means for said heating element and said outlet means positioned externally in relation to said chamber; and supporting means positioned externally of said chamber for supporting objects, said supporting means being mounted to said chamber defining means in relation to said windows to provide for external separation of airflow as it enters said first window and leaves said second window, to provide for circulation of air around said supporting means and objects thereon.

References Cited

UNITED STATES PATENTS

| | | | |
|---|---|---|---|
| 2,450,478 | 10/1948 | Johnson | 165—26 |
| 2,465,389 | 3/1949 | Morris | 165—26 |
| 2,671,643 | 3/1954 | Gordon | 165—108 X |
| 2,767,118 | 10/1956 | Gaymont | 165—46 X |
| 3,161,782 | 12/1964 | Vieth | 165—26 X |

FOREIGN PATENTS 1,292,228  3/1962  France.

ROBERT A. O'LEARY, *Primary Examiner.*

M. A. ANTONAKAS, *Assistant Examiner.*